(12) United States Patent
Jokisch et al.

(10) Patent No.: US 8,412,616 B2
(45) Date of Patent: *Apr. 2, 2013

(54) SYSTEMS AND METHODS FOR PROVIDING ENHANCED VOLUME-WEIGHTED AVERAGE PRICE TRADING

(75) Inventors: Philipp T. Jokisch, London (GB); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/727,717

(22) Filed: Mar. 19, 2010

(65) Prior Publication Data
US 2010/0185542 A1  Jul. 22, 2010

Related U.S. Application Data (63) Continuation of application No. 12/412,750, filed on Mar. 27, 2009, now Pat. No. 7,702,572, which is a continuation of application No. 10/966,526, filed on Oct. 15, 2004, now Pat. No. 7,536,342.

(60) Provisional application No. 60/512,029, filed on Oct. 17, 2003.

(51) Int. Cl.
*G06Q 40/00* (2012.01)
(52) U.S. Cl. .......................................... 705/37
(58) Field of Classification Search ................ 705/37
See application file for complete search history.

(56) References Cited

U.S. PATENT DOCUMENTS

| | | |
|---|---|---|
| 4,980,826 A | 12/1990 | Wagner |
| 5,845,266 A | 12/1998 | Lupien et al. |
| 6,098,051 A | 8/2000 | Lupien et al. |
| 6,912,511 B1 | 6/2005 | Eliezer et al. |
| 6,996,539 B1 | 2/2006 | Wallman |
| 7,110,974 B1 | 9/2006 | Rust |
| 7,299,208 B1 | 11/2007 | Bailon et al. |
| 7,469,229 B2 | 12/2008 | Romani |
| 7,702,572 B2 | 4/2010 | Jokisch et al. |
| 2001/0034696 A1 | 10/2001 | McIntyre |
| 2001/0037284 A1 | 11/2001 | Finkelstein et al. |
| 2001/0044767 A1 | 11/2001 | Madoff et al. |
| 2002/0019795 A1 | 2/2002 | Madoff et al. |
| 2002/0052827 A1 | 5/2002 | Waelbroeck et al. |
| 2002/0091617 A1 | 7/2002 | Keith |
| 2002/0099651 A1 | 7/2002 | May |
| 2002/0111896 A1 | 8/2002 | Ben-Levy et al. |
| 2002/0156719 A1 | 10/2002 | Finebaum et al. |
| 2002/0174060 A1 | 11/2002 | Friedland et al. |
| 2002/0194107 A1 | 12/2002 | Li et al. |

(Continued)

FOREIGN PATENT DOCUMENTS

| | | |
|---|---|---|
| WO | 01/84419 | 11/2001 |
| WO | 03/036540 | 5/2003 |

OTHER PUBLICATIONS

"POSIT 4 in action," printed from www.itginc.com on Jan. 30, 2003 (2 pages).

(Continued)

*Primary Examiner* — Charles Kyle
*Assistant Examiner* — Clifford Madamba
(74) *Attorney, Agent, or Firm* — Glen R. Farbanish (57) ABSTRACT

Systems and methods for providing trading using an eVWAP price in an illiquid market are provided. In an illiquid market there may be little or no actual trades. During a trading period, the eVWAP price is therefore determined from not only trades, but also unmatched bids and offers. The eVWAP price is determined when new information becomes available or at a specified time interval. The final eVWAP price is determined when the sampling period ends. Once the final eVWAP price is determined, the value of the final eVWAP price is published for use as a price to settle a contract.

27 Claims, 3 Drawing Sheets

U.S. PATENT DOCUMENTS

| | | | |
|---|---|---|---|
| 2002/0198816 A1 | 12/2002 | Gilbert et al. | |
| 2003/0004852 A1 | 1/2003 | Burns | |
| 2003/0004853 A1 | 1/2003 | Ram et al. | |
| 2003/0014354 A1 | 1/2003 | Madoff et al. | |
| 2003/0033239 A1 | 2/2003 | Gilbert et al. | |
| 2003/0088495 A1 | 5/2003 | Gilbert et al. | |
| 2003/0177126 A1* | 9/2003 | Weingard et al. | 707/10 |
| 2003/0225673 A1 | 12/2003 | Hughes et al. | |
| 2004/0236614 A1 | 11/2004 | Keith | |
| 2004/0236636 A1* | 11/2004 | Lutnick et al. | 705/26 |
| 2005/0144061 A1 | 6/2005 | Rarity et al. | |
| 2005/0149426 A1 | 7/2005 | Jokisch et al. | |
| 2005/0192890 A1 | 9/2005 | Wallman | |
| 2006/0229967 A1 | 10/2006 | Sweeting et al. | |
| 2006/0271469 A1 | 11/2006 | Rust | |
| 2009/0281954 A1 | 11/2009 | Waelbroeck et al. | |
| 2010/0030655 A1 | 2/2010 | Lutnick et al. | |
| 2010/0185542 A1 | 7/2010 | Jokisch et al. | |

OTHER PUBLICATIONS

"POSIT®—How POSIT works," printed from www.itginc.com on Mar. 20, 2003 (2 pages).

"What you may not know about POSIT®," printed from www.itginc.com on Jan. 30, 2003 (2 pages).

"POSIT®, Where Risk control meets cost control," printed from www.iginc.com on Jul. 7, 2004 (2 pages).

"POSIT® After Hours—Bringing Superior Portfolio Controls to After Hours Trading," printed from www.itginc.com on Jul. 7, 2004 (2 pages).

The Primes Auction, http://www.primextrading.com, available through Internet Archive Wayback Machine at http://web.archive.org/web/20021013043720/www.primetrading.com/introduction/two-steps/, as archived on Sep. 28, 2002 and Oct. 13, 2002, respectively.

Pending U.S. Appl. No. 10/966,526 entitled "Systems and Methods for Providing Enhanced Volume-Weighted Average Price Trading", in the name of Phillipp T. Jokisch et al., filed Oct. 15, 2004.

U.S. PTO Office Action for U.S. Appl. No. 10/678,582; 18 pages; Aug. 5, 2008.

"POSIT®," printed from www.equitystation.com on Jan. 30, 2003 (1 page).

"A Powerful New Option for POSIT® Users," printed from www.itginc.com on Jan. 30, 2003 (4 pages).

U.S. PTO Office Action for U.S. Appl. No. 10/397,109; 13 pages; Dec. 28, 2007.

U.S. PTO Office Action for U.S. Appl. No. 10/397,109; 12 pages; Oct. 16, 2008.

European Office Action for European Application No. 04256362.7; 5 pages; Sep. 5, 2008.

Pending U.S. Appl. No. 10/678,582; 41 pages; Oct. 2, 2003.

Pending U.S. Appl. No. 10/397,109; 40 pages; filed Mar. 24, 2003.

U.S. PTO Office Action for U.S. Appl. No. 10/397,109; 12 pages; Feb. 9, 2009.

U.S. PTO Office Action for U.S. Appl. No. 10/966,526; 6 pages; Jan. 6, 2009.

United States Patent and Trademark Office: Office Action for U.S. Appl. No. 10/678,582 in the name of Howard Lutnick, et. al.; 11 pages; Jul. 7, 2006.

United States Patent and Trademark Office: Office Action for U.S. Appl. No. 10/678,582 in the name of Howard Lutnick, et. al.; 23 pages; Aug. 23, 2007.

United States Patent and Trademark Office: Office Action for U.S. Appl. No. 10/678,582 in the name of Howard Lutnick, et. al.; 13 pages; Feb. 20, 2007.

United States Patent and Trademark Office: Office Action for U.S. Appl. No. 10/678,582 in the name of Howard Lutnick, et. al.; 20 pages; Apr. 17, 2008.

United States Patent and Trademark Office; Office Action for U.S. Appl. No. 10/966,526, filed Oct. 15, 2004, in the name of Phillipp T. Jokisch; 14 pages, Apr. 14, 2008.

Notice of Allowance for U.S. Appl. No. 10/966,526; 8 pages; Mar. 17, 2009.

Notice of Allowance for U.S. Appl. No. 10/678,582; 9 pages; Apr. 16, 2009.

"Experimental Markets for Product Concepts" by Nicholas T. Chan, Ely Dahan, Andrew W. Lo, and Thomas Poggio. Jul. 2001. retrieved at <http://hdl.handle.net/1721.1/7233>.

U.S. PTO Office Action for U.S. Appl. No. 12/412,750; 6 pages; Jun. 11, 2009.

Notice of Allowance for U.S. Appl. No. 12/412,750; 6 pages Dec. 2, 2009.

Notice of Allowance for U.S. Appl. No. 12/412,750; 4 pages Mar. 8, 2010.

Gehrig, Thomas; Intermediation in Search Markets; Northwestern University, Center for Mathematical Studies in Economics and Management Science; Discussion Papers: 1058 (1993).

Cully, Paul; IPE Electronic Trade Update; Platts Oilgram News; vol. 78, No. 123, p. 5 (Jun. 27, 2000).

Anonymous; Board of Trade of Kansas City; KCBT Presient Michael Braude appears on CNBC's "Today's Busines", M2 Presswire (Sep. 25, 1997).

U.S. PTO Office Action for U.S. Appl. No. 12/436,940; Jun. 22, 2010; 16 pages.

Pending U.S. Appl. No. 12/983,189, filed Nov. 2, 2010; 40 pages.

Australian Examination Report for 2010200795, Jun. 27, 2011, 3 pages.

Australian Examination Report for 2010200795, Sep. 20, 2011, 3 pages.

Australian Examination Report for 2004220731, Sep. 25, 2008, 2 pages.

Notice of Acceptance for 2004220731, Nov. 24, 2009, 3 pages.

Canadian Examination Report for 2,484,813, Jan. 16, 2012, 3 pages.

Notice of Allowance for U.S. Appl. No. 12/436,940; Mar. 23, 2011; 6 pages.

U.S. PTO Office Action for U.S. Appl. No. 12/938,189; 33 pages; Aug. 17, 2012.

Canadian Examination Report for 2,461,768, Mar. 27, 2012, 5 pages.

\* cited by examiner

SYSTEMS AND METHODS FOR PROVIDING ENHANCED VOLUME-WEIGHTED AVERAGE PRICE TRADING

This application is a continuation of U.S. patent application Ser. No. 12/412,750, (U.S. patent application publication No. 2009-0182660), filed Mar. 27, 2009 now U.S. Pat. No. 7,702,572, which is a continuation of U.S. Pat. No. 7,536,342 (U.S. patent application Ser. No. 10/966,526), filed Oct. 15, 2004, which claims the benefit of U.S. provisional application No. 60/512,029, filed Oct. 17, 2003, each of which is hereby incorporated by reference herein in its entirety.

BACKGROUND OF THE INVENTION

The present invention relates to systems and methods for calculating an enhanced volume-weighted average price, and more particularly to trading systems that allow traders to place orders on average price contracts based on trades, bids, and offers.

Electronically based trading systems have gained widespread popularity over the years. Such trading systems are frequently used for trading items ranging from financial instruments (such as stocks, bonds, currency, futures, contracts, etc.) to used household goods (such as old records, baseball cards, antiques, etc.). In many of these trading systems, bid/offer-hit/lift processes are used to negotiate a sale of a given item. In connection with such processes, bids and/or offers for items are entered into a trading system and a hit or lift is submitted in response to a bid or offer, respectively, to agree to a sale, or a purchase.

Historically, traders use benchmarks to evaluate their trades. Determining the volume-weighted average price (hereinafter the "VWAP") is one of the most common trade evaluation benchmarks. Traders, brokers, institutional investors, and managers determine the quality of their trades by calculating the VWAP and comparing the VWAP to the prices of which their trades were executed. For example, if a trader purchased a stock today at a price lower than the current cumulative VWAP, the trader bought the stock at a good price—i.e., better than the average buyer of the stock. On the other hand, if the trader bought the stock at a price higher than the VWAP, then the trader overpaid for the stock relative to other buyers of the day. Traders often monitor the VWAP to, for example, predict when short term buying and selling opportunities may arise.

There are markets that provide trading data such that the VWAP may be calculated. One embodiment of an interactive trading system that allows traders to trade on the VWAP is described in co-pending, commonly-assigned U.S. patent application Ser. No. 10/678,582, filed Oct. 2, 2003, and U.S. Provisional Application No. 60/415,843, filed Oct. 2, 2002, which are hereby incorporated by reference herein in their entireties. Trading on the VWAP may provide an opportunity for buyers and sellers to buy or sell items at a price that is the VWAP price or at a price that closely tracks the VWAP price.

However, the conventional VWAP may not be calculated for an illiquid market or a temporarily illiquid market which has little or no volume of trades. Illiquid markets and temporarily illiquid markets that have little or no volume of trades do not allow traders to buy and sell items without causing a significant and possibly disproportionate price change.

Therefore, it would be desirable to provide traders with an opportunity to evaluate instruments traded in illiquid markets or temporarily illiquid markets using an approach for calculating an enhanced VWAP price. It would also be desirable to provide an enhanced VWAP price, for an instrument, that may be used as a basis for trading derivatives of that instrument (i.e., the enhanced VWAP price may be used to mark a closing price for which derivative contracts may settle).

SUMMARY OF THE INVENTION

It is therefore an object of this invention to provide traders with an opportunity to evaluate instruments traded in illiquid markets or temporarily illiquid markets using an approach for calculating an enhanced VWAP price (hereinafter "eVWAP"). It is also an object of this invention to provide an eVWAP price, for an instrument, that may be used as a basis for trading derivatives of that instrument (i.e., the eVWAP price may be used to mark a closing price for which derivative contracts may settle).

These and other objects are accomplished in accordance with the principles of the present invention by providing systems and methods that provide traders with an eVWAP price that uses unmatched bid and offer prices to support or back up traded price volumes over a predetermined sampling period or trading period, thereby alleviating the above-mentioned difficulties. Such an approach may be used for illiquid markets or temporarily illiquid markets where there may be little or no actual trades. The approach for calculating the eVWAP price may include adjusting the eVWAP price using data (e.g., price and size information) from unmatched bids and offers. Unmatched bids and offers may be those bids and offers that have not been hit or lifted.

As used herein, the "eVWAP" or "eVWAP price" is a weighted average price based on trade data (e.g., the prices and volume of trades) and unmatched bid and offer data (e.g., bid price, offer price, etc.) done on one or more items within a specified sampling period. As the specified sampling period progresses, all trade prices and sizes, bid prices and sizes, and offer prices and sizes of an item are collected. In response to collecting the data entered by traders, the eVWAP may be calculated based on the collected trade, bid, and offer data as they appear during the sampling period. For example, an eVWAP price may be recalculated when new trade, bid, or offer data becomes available, and may be published to the market as the eVWAP price builds during the sampling period.

In an illiquid market, publishing the eVWAP price during the sampling period may attract further liquidity. Since the eVWAP price includes bid and offer data, in addition to trade data (which is all the VWAP generally includes), changes in the eVWAP price will be more active than the VWAP and may encourage traders to enter bids and offers. Additional bids and offers may in turn create a more liquid market.

In some embodiments, the collected bids and offers may be limited to a particular collar (i.e., a predetermined price range in which bids and offers may be accepted). Bids and offers outside of the collar are preferably not used in the calculation of the eVWAP price. For example, all trade data may be used to calculate the eVWAP price, while only bids and offers within the collar are used to calculate the eVWAP price. The collar may be adjusted as the eVWAP price builds in reference to a cumulative "reference price." The "reference price" is preferably calculated as the eVWAP sampling period progresses (e.g., in real-time or at another suitable periodic interval). Although data from unmatched bids and offers may be used to calculate the eVWAP price, it should be noted that an actual trade may have a substantially larger influence on the eVWAP price than unmatched bids and offers. That is, an actual trade may reduce the significance of bid and offer values in the eVWAP price determined at the end of the sampling period.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which.

DETAILED DESCRIPTION OF THE INVENTION

This invention relates to creating systems and methods for calculating an enhanced volume-weighted average price based on trades, bids, and offers. The following embodiment of the invention relates to the electronic trading of fixed income related instruments—e.g., such as the United States Treasuries, United Kingdom Gilts, European Government Treasuries, and Emerging Market debts, swaps, repos, etc. This invention may also be used for the electronic trading of securities or other financial instruments, such as stocks or currencies, and is not limited only to the trading of fixed income related instruments. Nevertheless, this embodiment does not limit the invention to this particular subject matter. Rather, it is provided for illustration of the invention and not to limit it to a particular commodity or market.

It should also be noted that although the following embodiment of the invention relates specifically to the trading of a single instrument, such as United States 30 Year U.S. Treasury bonds, this embodiment is not limited only to the trading of a single instrument. Rather, the invention may also be applied to the trading of a basket of instruments. For example, traders may trade on the eVWAP price on the net price movements of the current two-year United States Treasury bills, three-year and five-year United States Treasury notes, and ten-year United States Treasury bonds.

An eVWAP price may be calculated that provides traders with an opportunity to trade in illiquid markets or temporarily illiquid markets where there may be little or no actual trades. The eVWAP price may use unmatched bid and offer prices to support or back up traded price volumes over a predetermined sampling period or trading period. This approach may include adjusting the eVWAP price using data (e.g., price and size information) from unmatched bids and offers of an instrument. The eVWAP price may be used as a basis for trading derivatives of that instrument (i.e., the eVWAP price may be used to mark a closing price for which derivative contracts may settle).

As mentioned previously, the collected bids and offers may be limited to a particular collar such that those bids and offers outside of the collar are preferably not used in calculation of the eVWAP price. However, if desired, a collar may not be imposed and all bids and offers may be used in calculation of the eVWAP price. If used, the collar may be adjusted as the eVWAP price builds in reference to a cumulative "reference price." The "reference price" is preferably calculated before the eVWAP sampling period progresses. The reference price may be the bid-offer spread at the starting time, which is preferably calculated using the following equation:

$$eVWAP_0 = \frac{(bid\_price_0 \times bid\_size_0) + (offer\_price_0 \times offer\_size_0)}{bid\_size_0 + offer\_size_0},$$

where $eVWAP_0$ is the initial reference price, and $bid\_price_0$, $bid\_size_0$, $offer\_price_0$, and $offer\_price_0$ are the bid price, bid size, offer price, and offer size, respectively, of an instrument at the start time of the eVWAP sampling period.

If there is not a bid-offer spread at the start of the sampling period, the reference price is the last traded price (i.e., $eVWAP_0 = last\_trade\_price$) and the total trade size is the last traded size (i.e., $total\_trade\_size_0 = last\_trade\_size$). It should be noted that if the last traded price is lower than the current bid or higher than the current offer, then the start point will be the bid or offer, respectively.

If there is no last traded price, then the reference price is the previous closing or reference price (i.e., $eVWAP_0 = closing\_price$) and the total trade size is set to 1 (i.e., $totaltradesize_0 = 1$).

The eVWAP price may be recalculated as new data relating to trades, bids, and offers is received. When the new data received is a trade, the traded price is multiplied by the trade size and added to the indicative price (i.e., $eVWAP_{t-1}$) multiplied by the previous total trade size. The result is divided by the total size traded. When a trade is received, the current eVWAP price may be calculated using the following equation:

$$eVWAP_t = \frac{(trade\_price_t \times trade\_size_t) + (eVWAP_{t-1} \times total\_trade\_size_{t-1})}{total\_trade\_size_t},$$

where $total\_trade\_size_t = total\_trade\_size_{t-1} + trade\_size_t$.

When the new data received is a bid, the eVWAP price is adjusted towards the bid. For example, if the bid is lower than the indicative price, the updated eVWAP price is also adjusted lower. When the new data received is an offer, the eVWAP price is adjusted towards the offer. For example, if the offer is lower than the indicative price, the updated eVWAP price is also adjusted lower. Although the algorithm may be applicable to any kind of instrument and market type, in the preferred embodiment, the instrument is traded in a normal market.

When a bid and an offer are received simultaneously, the eVWAP price is adjusted according to the accumulated bid and offer adjustments. That is, the adjustment is equivalent to the sum of the bid and offer adjustments. If the indicative price is between the bid and the offer, then the bid adjustment generates a negative number, while the offer adjustment generates a positive number. If the existing indicative price is higher than the newly received bid and the newly received offer, then the bid adjustment and the offer adjustment both generate a negative number. If the existing indicative price is lower than the newly received bid and the newly received offer, then the bid adjustment and the offer adjustment both generate a positive number. When a bid and/or offer is received, the current eVWAP price is preferably calculated using the following equation:

$$eVWAP_t =$$

$$\left( eVWAP_{t-1} + \cfrac{\text{bid\_flag} * \left(\cfrac{\text{bid\_size}_t^{bid\_size\_flag}}{\text{total\_trade\_size}_{t-1}}\right)^{trade\_ratio\_flag} *}{(1 + \text{bid\_scaling\_factor} * |bid_t - eVWAP_{t-1}|)^{bid\_exponent}} + \cfrac{\text{offer\_flag} * \left(\cfrac{\text{offer\_size}_t^{offer\_size\_flag}}{\text{total\_trade\_size}_{t-1}}\right)^{trade\_ratio\_flag} *}{(1 + \text{offer\_scaling\_factor} * |offer_t - eVWAP_{t-1}|)^{offer\_exponent}} \right)$$

These two algorithms may be combined to calculate an eVWAP price that takes into account trades, bids, and offers as they appear during the specified sampling period. The eVWAP, during the sampling period, is preferably calculated using the following algorithm:

$$eVWAP_t = \text{trade\_flag} *$$

$$\left( \cfrac{(\text{trade\_price}_t * \text{trade\_size}_t + eVWAP_{t-1} * \text{total\_trade\_size}_{t-1})}{\text{total\_trade\_size}_t} \right) +$$

$$\text{bidoffer\_flag} *$$

$$\left( eVWAP_{t-1} + \cfrac{\text{bid\_flag} * \left(\cfrac{\text{bid\_size}_t^{bid\_size\_flag}}{\text{total\_trade\_size}_{t-1}}\right)^{trade\_ratio\_flag} *}{(1 + \text{bid\_scaling\_factor} * |bid_t - eVWAP_{t-1}|)^{bid\_exponent}} + \cfrac{\text{offer\_flag} * \left(\cfrac{\text{offer\_size}_t^{offer\_size\_flag}}{\text{total\_trade\_size}_{t-1}}\right)^{trade\_ratio\_flag} *}{(1 + \text{offer\_scaling\_factor} * |offer_t - eVWAP_{t-1}|)^{offer\_exponent}} \right)$$

where:
total_trade_size$_t$=total_trade_size$_{t-1}$+trade_size$_t$);
trade_flag={0,1};
bidoffer_flag={0,1};
offer_flag={0,1};
bid_flag={0,1};
bid_size_=flag={0,1};
offer_size_flag={0,1};
trade_ratio_flag={0,1};
bid_ratio_flag={0,1};
offer_ratio_flag={0,1};
|bid$_t$–evWAP$_{t-1}$| is the absolute value of the difference between bid$_t$ and eVWAP$_{t-1}$;
|offer$_t$–eVWAP$_{t-1}$| is the absolute value of the difference between offer$_t$ and eVWAP$_{t-1}$; and
bid_scaling_factor, offer_scaling_factor, bid_size_ratio, offer_size_ratio, bid_exponent, and offer_exponent are other parameters.

The values set for the other parameters may depend upon the market in which the eVWAP is operating. For example, certain factors, such as the size, liquidity, volatility, and any other suitable factors of the market, may play a role in determining the values for these other parameters. Once the values for these other parameters in a particular market are set, these values may remain constant for that market throughout the sampling period.

As shown above in the eVWAP algorithm, the "size ratio" (e.g., bid_size_ratio and offer_size_ratio) may be used to show the importance of bid and offer data with respect to trade data and is preferably a constant value. The "size ratio," along with other parameters, does not need to be a constant value and may be a function of other terms or parameters. In some embodiments, bids and offers may be given equal weight. It should also be noted that the effect of bids and offers to adjust the eVWAP price decreases with the total traded size.

The eVWAP$_{t-1}$ is preferably calculated as the eVWAP sampling period progresses (e.g., in real-time or at another suitable interval for a certain period). As shown, the effect of bids and offers to adjust the eVWAP price decreases with the exponent of the absolute value of the difference between the bid/offer price and the indicative price (or eVWAP$_{t-1}$). The impact on the eVWAP will decrease with the increase of the difference between the bid/offer price and the indicative price because the difference between the bid/offer price and the indicative price is in the denominator of the algorithm. That is, bid/offer prices that are closer to the indicative price will produce a greater adjustment to the eVWAP because bid/offer prices closer to the indicative price are likely more accurate indicators of how the eVWAP should be adjusted. The "scaling factor" (e.g., bid_scaling_factor and offer_scaling_factor) may be a multiplier, such as a multiplier of the discount rate, and is preferably a constant value. The scaling factor may be used to inflate or deflate the importance of the proximity between the bid/offer price and the indicative price.

Flags may also be used to indicate the type of data that is being received, such as, for example, trading data, bid data, offer data, etc. Each flag may be set to a value such as a "0" to indicate that the flag is turned off or a "1" to indicate that the flag is turned on. An example of settings for various flags is shown in Table 1.

TABLE 1

| Action | Flag |
| --- | --- |
| Trade | trade_flag = {0, 1} |
| | If the next information received is a trade, then trade_flag = 1, bidoffer_flag = 0, bid_flag = 0, and offer_flag = 0. Otherwise (no trade), trade_flag = 0. |
| Bid | bidoffer_flag = {0, 1} and bid_flag = {0, 1} |
| | If the received data is related to a bid, then bidoffer_flag = 1, bid_flag = 1, and trade_flag = 0. Otherwise (no bid), bid_flag = 0. |
| Offer | bidoffer_flag = {0, 1} and offer_flag = {0, 1} |
| | If the received data is related to an offer, then bidoffer_flag = 1, offer_flag = 1, and trade_flag = 0. Otherwise (no offer), offer_flag = 0. |
| Simultaneous Bid and Offer | bidoffer_flag = {0, 1}, bid_flag = {0, 1}, and offer_flag = {0, 1} |
| | If the received information is both a bid and an offer, then bidoffer_flag = 1, bid_flag = 1, offer_flag = 1, and trade_flag = 0. |
| Bid Size and Offer Size | bid_size_flag = {0, 1}, offer_size_flag = {0, 1} |
| | Bid_size_flag and offer_size_flag are used to set the size ratio to bid_size$_t$/total_trade_size$_{t-1}$ or to 1/total_trade_size$_{t-1}$ as bid_size$^0$ = 1. Similarly, offer_size$^0$ = 1 for offer_size_flag = 0. The "size flag" may be set if it is desirable to factor in the size of the bid/offer. For example, in the beginning of a sampling period the size flag may be set to zero to dampen the impact |

TABLE 1-continued

| Action | Flag |
|---|---|
| | bids/offers have on eVWAP since the size ratio will result in a number less than zero (i.e., 1/total_trade_size$_{t-1}$). It may be desirable to dampen the impact bids/offers have on the eVWAP in the beginning because there will be little volume since it is an illiquid market or a temporarily illiquid market. At times, accounting for the bid/offer size may create undesirable spikes in the eVWAP price. |
| Trade Ratio | trade_ratio_flag = {0, 1}<br>trade_ratio_flag enables or disables the terms:<br><br>$\dfrac{\text{bid\_size}_t^{bid\_size\_flag}}{\text{total\_trade\_size}_{t-1}}$ and $\dfrac{\text{offer\_size}_t^{offer\_size\_flag}}{\text{total\_trade\_size}_{t-1}}$<br><br>When trade_ratio_flag = 1:<br><br>$\left(\dfrac{\text{bid\_size}_t^{bid\_size\_flag}}{\text{total\_trade\_size}_{t-1}}\right)^1 = \dfrac{\text{bid\_size}_t^{bid\_size\_flag}}{\text{total\_trade\_size}_{t-1}}$ and<br><br>$\left(\dfrac{\text{offer\_size}_t^{offer\_size\_flag}}{\text{total\_trade\_size}_{t-1}}\right)^1 = \dfrac{\text{offer\_size}_t^{offer\_size\_flag}}{\text{total\_trade\_size}_{t-1}}$<br><br>When trade_ratio_flag = 0,<br><br>$\left(\dfrac{\text{bid\_size}_t^{bid\_size\_flag}}{\text{total\_trade\_size}_{t-1}}\right)^0 = 1$<br><br>and $\left(\dfrac{\text{offer\_size}_t^{offer\_size\_flag}}{\text{total\_trade\_size}_{t-1}}\right)^0 = 1$<br><br>The trade_ratio_flag may be used to adjust the impact on the eVWAP of the bid/offer size as compared with the total size of the trade. |

An example of settings for various other parameters is shown in Table 2. The settings of these parameters in Table 2 may be optional and the values may be chosen in any way that is desirable.

TABLE 2

| Action | Variable |
|---|---|
| If bid$_t$ > eVWAP$_{t-1}$ | bid_exponent = 0 |
| If offer$_t$ < eVWAP$_{t-1}$ | offer_exponent = 0 |

In some embodiments, lower and upper bounds may be set for the bid and offer prices. In this way, the bids and offers may be limited to a particular collar. For example, the upper bound for bid and offer prices may be calculated using the following equation:

$$\text{bid\_upper\_bound} = eVWAP_t + \dfrac{1}{\text{bid\_scaling\_factor} * \text{bid\_exponent} - \text{bid\_scaling\_factor}}$$

$$\text{offer\_upper\_bound} = eVWAP_t + \dfrac{1}{\text{offer\_scaling\_factor} * \text{offer\_exponent} - \text{offer\_scaling\_factor}}$$

Similarly, the lower bound for bid and offer prices may be, for example:

$$\text{bid\_lower\_bound} = eVWAP_t - \dfrac{1}{\text{bid\_scaling\_factor} * \text{bid\_exponent} - \text{bid\_scaling\_factor}}$$

$$\text{offer\_lower\_bound} = eVWAP_t - \dfrac{1}{\text{offer\_scaling\_factor} * \text{offer\_exponent} - \text{offer\_scaling\_factor}}$$

However, any other suitable approach for calculating upper and lower bounds may also be used. The upper_bound equations may calculate the maximum point and the lower_bound equations may calculate the minimum point for the above-mentioned eVWAP algorithm for any scaling_factor values and exponent values. Based at least in part on the determined maximum and minimum points, the scaling factor value and exponent factor value may be set. For some chosen scaling_factor values and exponent values, the derivative of the above-mentioned eVWAP algorithm may not lead to determining a maximum and minimum point. In this scenario, another approach may be used to calculate the upper and lower bounds. For example, a percentage deviation from the reference price may be used as the upper and lower bounds.

In some embodiments, bid sizes and offer sizes may not be included in the algorithm for calculating the eVWAP price. This may be achieved by setting the bid_size_flag and the offer_size_flag to zero.

Figure 1:
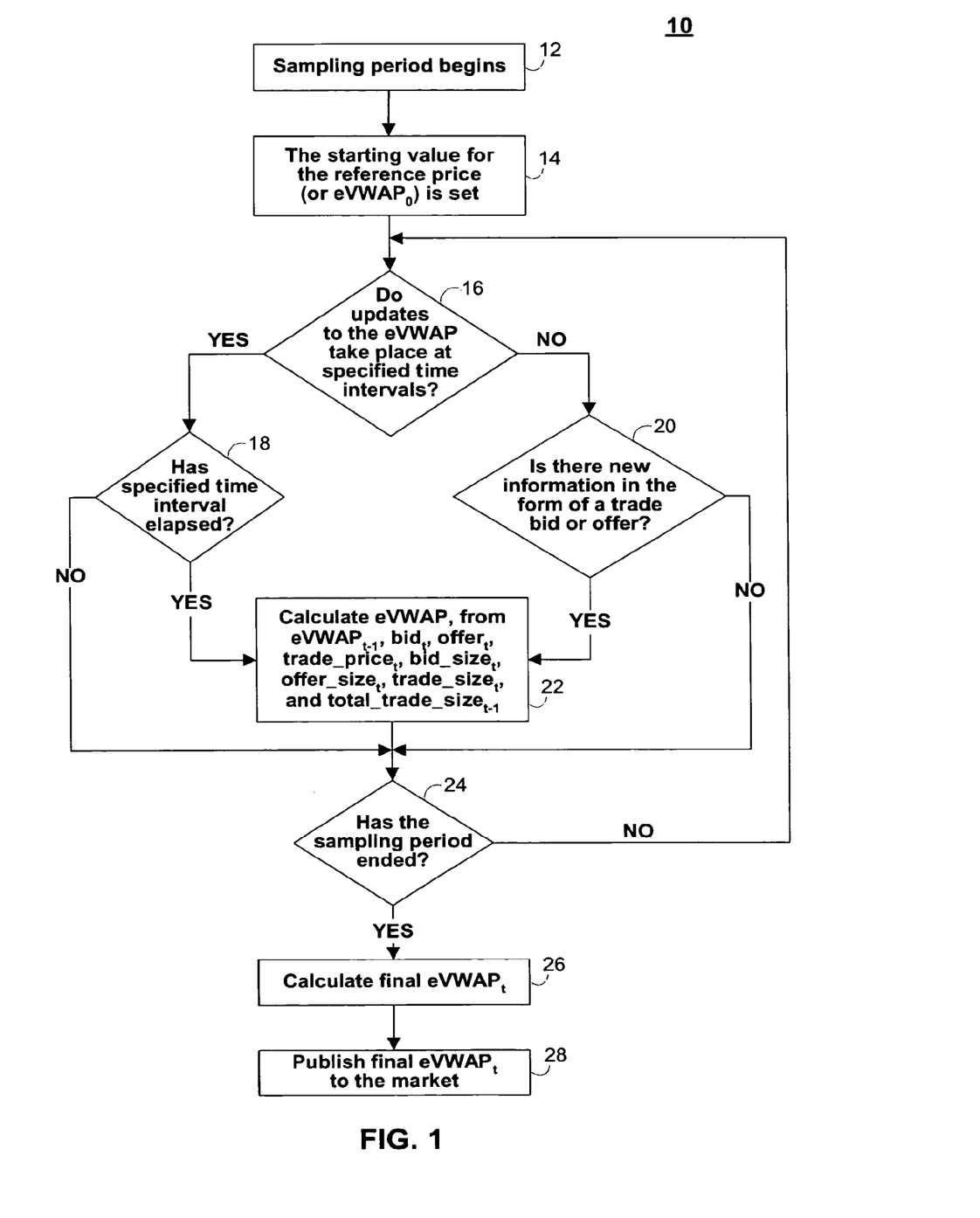
FIG. 1 is a flow diagram of a main process that may be used to provide an enhanced volume-weighted average price with certain embodiments of the present invention.

One embodiment of an eVWAP trading process that may be used in accordance with the principles of the present invention is illustrated in process 10 of FIG. 1. In practice, one or more steps shown may be combined with other steps, performed in any suitable order, or deleted. At step 12, a predetermined sampling period or trading period may begin. At step 14, the starting value for the reference price (or eVWAP$_0$) may be set. As described above, the starting value may be calculated from the bid-offer spread, the last traded price and last traded size, the current bid if the last traded price is lower than the current bid, the current offer if the last traded price is lower than the current offer, the previous closing price and setting the total trade size to 1, or in any other suitable manner.

As described above, the eVWAP may be recalculated during the sampling period as new trade, bid, or offer data becomes available (i.e., the eVWAP may be recalculated in real-time). The eVWAP may also be recalculated at periodic time intervals. As shown in step 16, if the updates to the eVWAP take place at specified or periodic time intervals, a determination may be made as to whether a specified time interval has elapsed at step 18. The specified time intervals may be every 'n' seconds, every 'n' minutes, every 'n' hours or any other suitable function of time. In response to the specified time interval elapsing, the eVWAP may be calculated at step 22.

If the updates to the eVWAP does not take place at specified or periodic time intervals, then, at step 20, the eVWAP may be recalculated by determining if new trade, bid, or offer information becomes available. New bid or offer information may be new bids or offers. New bid or offer information may also be reflected in changes of the price, the size, or both the price and size of previously entered bids or offers. If new information does become available, then the eVWAP may be calculated at step 22 in accordance with the algorithm described above in paragraph 26 or by any other suitable algorithm. As described above, steps of process 10 may be deleted. For example, steps 16 and 18 may be deleted and step 20 may be performed immediately after step 14.

In response to determining that a specified time interval has not elapsed at step 18, in response to determining that new trade, bid, or offer information has not become available at step 20, or in response to calculating the eVWAP at step 22, a determination may be made as to whether the sampling period has ended at step 24. If the sampling period has not ended then process 10 may return to step 16 and follow the steps described above. Once the sampling period has ended, the final eVWAP$_t$ may be calculated at step 26 in accordance with the algorithm described above in paragraph 26 or by any other suitable algorithm.

At step 28, the final eVWAP$_t$ may be published to the market. The final eVWAP$_t$ may be published to the market in any suitable form. For example, the final eVWAP$_t$ may be published by e-mail, by fax, on a ticker, on television, by posting the value to a server, by posting the value to a web site or by any other suitable form of publication. If the final eVWAP$_t$ is published by being posted to a server, the value may be posted to a local server, to an FTP server, to a third-party vendor's server (e.g., Reuters®, Bloomberg®, or any other third-party vendor), or to any other suitable server. The final eVWAP price may then be used as a basis for trading derivatives of an instrument (i.e., the eVWAP price may be used to mark a closing price for which derivative contracts may settle).

An electronic trading application may be provided to provide traders with the eVWAP price. The eVWAP price may be recalculated to account for trades, bids, and offers as received during the eVWAP specified sampling period. It will be understood that the electronic trading application may be any suitable, software, hardware, or both configured to implement the features of the present invention. The electronic trading application may be located at a central location (e.g., a central server). In another suitable approach, the electronic trading application may reside among different locations (e.g., a network).

In one particular embodiment, the electronic trading application may include client-side software, hardware, or both. For example, the electronic trading application may encompass one or more Web-pages or Web-page portions (e.g., via any suitable encoding, such as XML, Cold Fusion, etc.).

Although the electronic trading application is described herein as being implemented on user computer equipment, this is only illustrative. The electronic trading application may be implemented on any suitable platform (e.g., personal computer, palmtop computer, laptop computer, personal digital assistant, cellular phone, etc.) to provide such features.

Figure 2:
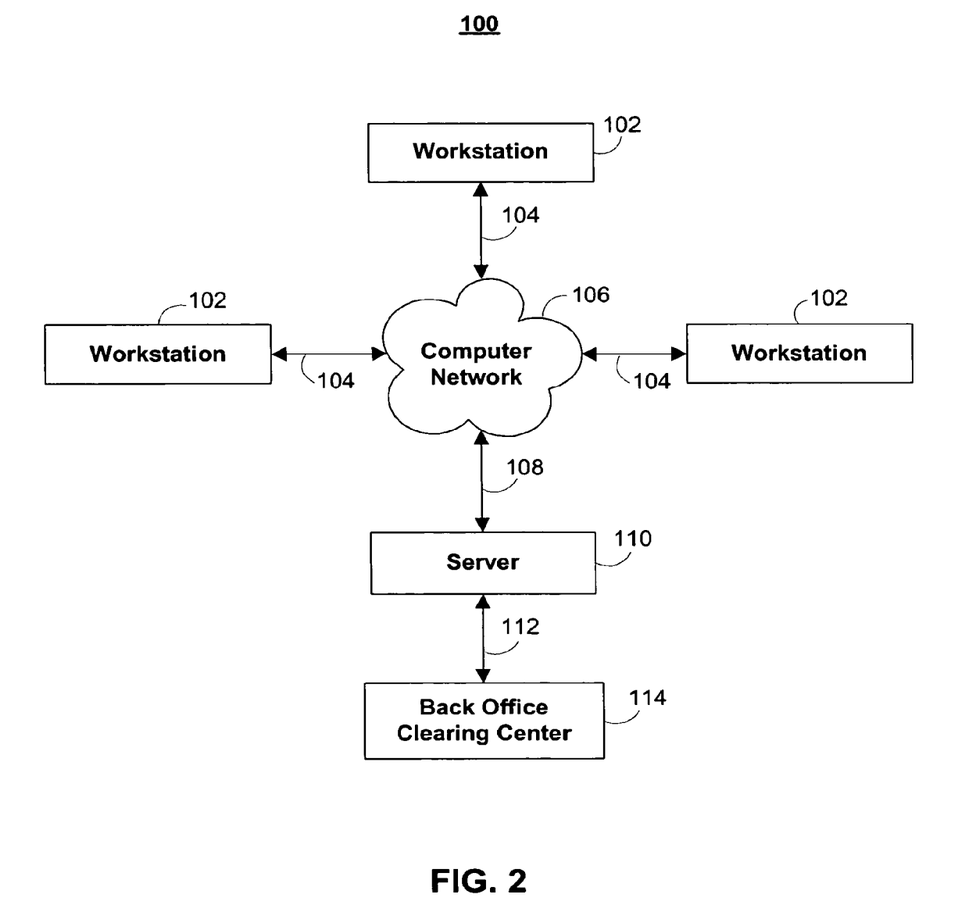
FIG. 2 is a block diagram of a system that may be used to implement processes and functions of certain embodiments of the present invention.

Referring to FIG. 2, an exemplary system 100 for implementing the present invention is shown. As illustrated, system 100 may include one or more trading workstations 102. Workstations 102 may be local or remote, and are connected by one or more communications links 104 to a computer network 106 that is linked via a communications link 108 to a server 110.

In system 100, server 110 may be any suitable server, processor, computer, or data processing device, or combination of the same. Computer network 106 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 106 may be any communications links suitable for communicating data between workstations 102 and server 110, such as network links, dial-up links, wireless links, hard-wired links, etc. Workstations 102 enable a trader to engage in the trading process. Workstations 102 may be personal computers, laptop computers, mainframe computers, dumb terminals, data displays, Internet browsers, personal digital assistants (PDAs), two-way pagers, wireless terminals, portable telephones, etc., or any combination of the same.

A back office clearing center 114 may also be connected to server 110 of the trading system via a communications link 112. Clearing center 114 may be any suitable equipment, such as a computer, or combination of the same, for causing trades to be cleared and/or verifying that trades are cleared. If desired, server 110 may contain multiple processors. Communications link 112 may be any communications link suitable for communicating data between server 110 and back office clearing center 114, such as network links, dial-up links, wireless links, hard-wired links, etc.

Figure 3:
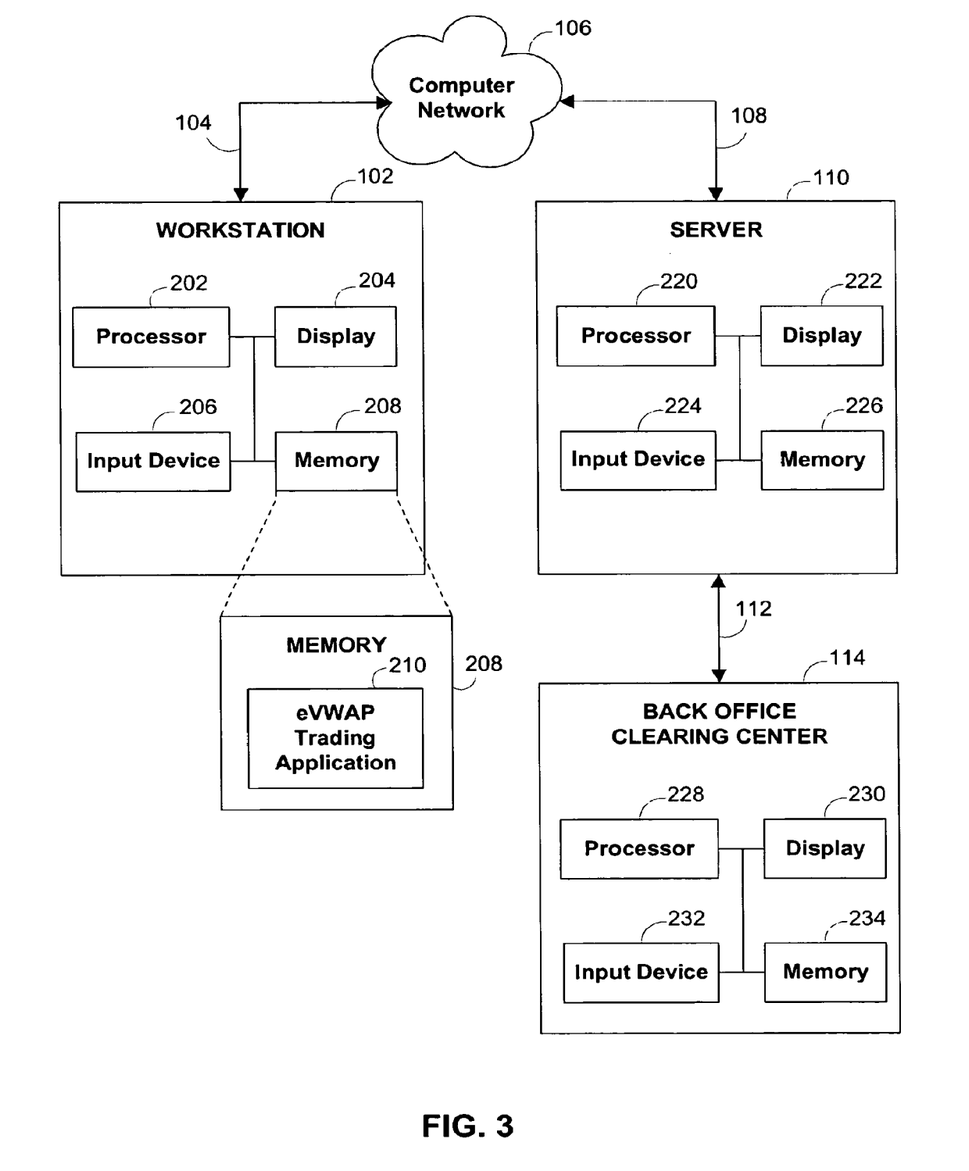
FIG. 3 is a block diagram of a workstation, a server, and a back office clearing center that may be used to implement the processes and functions of certain embodiments of the present invention.

The server, the back office clearing center, and one of the workstations, which are depicted in FIG. 2, are illustrated in more detail in FIG. 3. Referring to FIG. 3, workstation 102 may include processor 202, display 204, input device 206, and memory 208, which may be interconnected. In a preferred embodiment, memory 208 contains a storage device for storing a workstation program for controlling processor 220. Memory 226 also preferably contains an eVWAP trading application 210 according to the invention.

eVWAP trading application 210 may preferably include an application program interface (not shown), or, as described above, eVWAP trading application 210 may be resident in the memory of server 110. In this embodiment, the electronic trading application may contain eVWAP trading application 210 and an application program interface (not shown) as a discrete application from the electronic trading application which also may be included therein. The only distribution to the trader may then be a Graphical User Interface which allows the trader to interact with eVWAP trading application 210 resident at server 110.

Processor 202 uses the workstation program to present on display 204 the electronic trading application and trading information relating to market conditions received through communication link 104 and trading commands and values transmitted by a trader of workstation 102. Furthermore, input device 206 may be used to manually enter commands and values in order for these commands and values to be communicated to the electronic trading application.

Server 110 may include processor 220, display 222, input device 224, and memory 226, which may be interconnected. In a preferred embodiment, memory 226 contains a storage device for storing information relating to market conditions received through communication link 108 or through other links, and also receives trading commands and values transmitted by one or more traders. The storage device further contains a server program for controlling processor 220. Processor 220 uses the server program to transact the purchase and sale of the fixed income related instruments and to perform the above-mentioned systems and methods.

Back office clearing center 114 may include processor 228, display 230, input device 232, and memory 234, which may be interconnected. In a preferred embodiment, memory 234 contains a storage device for storing a clearing program for controlling processor 228. Processor 228 may use the clearing program to complete the transactions that are entered into by the traders. Processor 228 uses the clearing program to further verify that the transactions are completed and cleared.

Thus, systems and methods for providing enhanced volume-weighted average price trading are provided. Persons skilled in the art will appreciate that the present invention can be practiced by other than the described embodiments, which are presented for purposes of illustration and not of limitation, and that the present invention is limited only by the claims which follow.

What is claimed is:

1. A method for providing an enhanced volume-weighted average price, the method comprising:
    using one or more programmed computers to determine a starting value for the enhanced volume-weighted average price for a sampling period;
    using one or more programmed computers to iteratively determine the enhanced volume-weighted average price when new information becomes available,
        wherein the new information includes new unmatched bids, new unmatched offers, and new trades,
        wherein the starting value is used in determining an initial one of the iteratively determined enhanced volume-weighted average prices,
        wherein determining the enhanced volume-weighted average price is based at least in part on a total trade size, and
        wherein the new unmatched bids and the new unmatched offers cause less of a change to the enhanced volume-weighted average price as the total trade size increases; and
    when the sampling period ends, using one or more programmed computers to publish a final one of the iteratively determined enhanced volume-weighted average prices.

2. The method of claim 1 wherein the enhanced volume-weighted average price is:

$$eVWAP_{t-1} + \left( \begin{array}{c} trade\_flag * \left( \dfrac{trade\_price_t * trade\_size_t + eVWAP_{t-1} * total\_trade\_size_{t-1}}{total\_trade\_size_t} \right) + bidoffer\_flag * \\[2ex] \left( bid\_flag * \left( \dfrac{bid\_size_t^{bid\_size\_flag}}{total\_trade\_size_{t-1}} \right)^{trade\_ratio\_flag} * \dfrac{bid\_size\_ratio^{bid\_ratio\_flag} * (bid_t - eVWAP_{t-1})}{(1 + bid\_scaling\_factor * |bid_t - eVWAP_{t-1}|)^{bid\_exponent}} + \right. \\[2ex] \left. offer\_flag * \left( \dfrac{offer\_size_t^{offer\_size\_flag}}{total\_trade\_size_{t-1}} \right)^{trade\_ratio\_flag} * \dfrac{offer\_size\_ratio^{offer\_ratio\_flag} * (offer_t - eVWAP_{t-1})}{(1 + offer\_scaling\_factor * |offer_t - eVWAP_{t-1}|)^{offer\_exponent}} \right) \end{array} \right).$$

3. The method of claim 1,
    wherein the using one or more programmed computers to determine the enhanced volume-weighted average price comprises using one or more programmed computers to determine the enhanced volume-weighted average price when a specified time interval elapses.

4. The method of claim 1,
    wherein the new information comprises a change in at least one of a price and a size of an existing unmatched bid or existing unmatched offer.

5. The method of claim 1,
    wherein the new information relating to the new trades causes a greater change to the enhanced volume-weighted average price than the new unmatched bids and new unmatched offers.

6. The method of claim 1,
    wherein the using one or more programmed computers to determine the enhanced volume-weighted average price further comprises using one or more programmed computers to adjust the enhanced volume-weighted average price towards a new unmatched bid price or a new unmatched offer price.

7. The method of claim 6,
    wherein the using one or more programmed computers to adjust the enhanced volume-weighted average price further comprises using one or more programmed computers to adjust the enhanced volume-weighted average price lower if the new unmatched bid price or the new unmatched offer price is lower than the enhanced volume-weighted average price.

8. The method of claim 6,
    wherein the using one or more programmed computers to adjust the enhanced volume-weighted average price further comprises using one or more programmed computers to adjust the enhanced volume-weighted average price higher if the new unmatched bid price or the new unmatched offer price is higher than the enhanced volume-weighted average price.

9. The method of claim 1,
    wherein the starting value for the enhanced volume-weighted average price is determined at least in part by a bid-offer spread.

10. The method of claim 1,
    wherein a first new unmatched bid or offer causes a greater adjustment to the enhanced volume-weighted average price than a second new unmatched bid or offer that is further from a reference price than the first new unmatched bid or offer.

11. The method of claim 1,
    wherein at a beginning of the sampling period the only part of the new unmatched bids and new unmatched offers that is used in determining the enhanced volume-weighted average price is the price of the new unmatched bids and new unmatched offer.

12. The method of claim 1,
    wherein the new unmatched bids and the new unmatched offers are only used in determining the enhanced volume-weighted average price when the new unmatched bids and the new unmatched offers are within a predetermined price range.

13. The method of claim 1,
    wherein the using one or more programmed computers to publish the final enhanced volume-weighted average price comprises posting the final enhanced volume-weighted average price to a server.

14. An apparatus having a server, the apparatus for providing an enhanced volume-weighted average price, the apparatus comprising:
    a server storage device;
    a server processor connected to the server storage device, the server storage device storing a service program for controlling the server processor;
    the server processor operative with the server program to:
        determine a starting value for the enhanced volume-weighted average price for a sampling period;

iteratively determine the enhanced volume-weighted average price when new information becomes available,
wherein the new information includes new unmatched bids, new unmatched offers, and new trades,
wherein the starting value is used in determining an initial one of the iteratively determined enhanced volume-weighted average prices,
wherein determining the enhanced volume-weighted average price is based at least in part on a total trade size, and
wherein the new unmatched bids and the new unmatched offers cause less of a change to the enhanced volume-weighted average price as the total trade size increases; and
when the sampling period ends, publish a final one of the iteratively determined enhanced volume-weighted average prices.

15. The apparatus of claim 14 wherein the enhanced volume-weighted average price is:

$$\text{trade\_flag} * \left( \frac{\left( \text{trade\_price}_t * \text{trade\_size}_t + eVWAP_{t-1} * \text{total\_trade\_size}_{t-1} \right)}{\text{total\_trade\_size}_t} \right) + \text{bidoffer\_flag} *$$

$$\left( eVWAP_{t-1} + \frac{\text{bid\_flag} * \left( \frac{\text{bid\_size}_t^{\text{bid\_size\_flag}}}{\text{total\_trade\_size}_{t-1}} \right)^{\text{trade\_ratio\_flag}} * \text{bid\_size\_ratio}^{\text{bid\_ratio\_flag}} * (bid_t - eVWAP_{t-1})}{(1 + \text{bid\_scaling\_factor} * |bid_t - eVWAP_{t-1}|)^{\text{bid\_exponent}}} + \right.$$

$$\left. \frac{\text{offer\_flag} * \left( \frac{\text{offer\_size}_t^{\text{offer\_size\_flag}}}{\text{total\_trade\_size}_{t-1}} \right)^{\text{trade\_ratio\_flag}} * \text{offer\_size\_ratio}^{\text{offer\_ratio\_flag}} * (offer_t - eVWAP_{t-1})}{(1 + \text{offer\_scaling\_factor} * |offer_t - eVWAP_{t-1}|)^{\text{offer\_exponent}}} \right).$$

16. The apparatus of claim 14,
wherein the server processor is further operative with the server program to determine the enhanced volume-weighted average price when a specified time interval elapses.

17. The apparatus of claim 14,
wherein the new information comprises a change in at least one of a price and a size of an existing unmatched bid or existing unmatched offer.

18. The apparatus of claim 14,
wherein the new information relating to the new trades causes a greater change to the enhanced volume-weighted average price than the new unmatched bids and new unmatched offers.

19. The apparatus of claim 14,
wherein the server processor is further operative with the server program to adjust the enhanced volume-weighted average price towards a new unmatched bid price or a new unmatched offer price.

20. The apparatus of claim 19,
wherein the server processor is further operative with the server program to adjust the enhanced volume-weighted average price lower if the new unmatched bid price or the new unmatched offer price is lower than the enhanced volume-weighted average price.

21. The apparatus of claim 19,
wherein the server processor is further operative with the server program to adjust the enhanced volume-weighted average price higher if the new unmatched bid price or the new unmatched offer price is higher than the enhanced volume-weighted average price.

22. The apparatus of claim 14,
wherein the starting value for the enhanced volume-weighted average price is determined at least in part by a bid-offer spread.

23. The apparatus of claim 14,
wherein a first new unmatched bid or offer causes a greater adjustment to the enhanced volume-weighted average price than a second new unmatched bid or offer that is further from a reference price than the first new unmatched bid or offer.

24. The apparatus of claim 14,
wherein at a beginning of the sampling period the only part of the new unmatched bids and new unmatched offers that are used in determining the enhanced volume-weighted average price is the price of the new unmatched bids and new unmatched offers.

25. The apparatus of claim 14,
wherein the new unmatched bids and the new unmatched offers are only used in determining the enhanced volume-weighted average price when the new unmatched bids and the new unmatched offers are within a predetermined price range.

26. The apparatus of claim 14,
wherein the server processor is further operative with the server program to post the final enhanced volume-weighted average price to a server.

27. An apparatus having a server, the apparatus for providing trading an enhanced volume-weighted average price, wherein the server includes a server program for controlling the server, the server operative with the server program to:
iteratively determine the enhanced volume-weighted average price when new information becomes available,
wherein the new information includes new unmatched bids, new unmatched offers, and new trades,
wherein determining the enhanced volume-weighted average price is based at least in part on a total trade size, and
wherein the new unmatched bids and the new unmatched offers cause less of a change to the enhanced volume-weighted average price as the total trade size increases; and
when a sampling period ends, publish a final one of the iteratively determined enhanced volume-weighted average prices.

* * * * *